US012131857B2

(12) United States Patent
Bergström et al.

(10) Patent No.: US 12,131,857 B2
(45) Date of Patent: Oct. 29, 2024

(54) TAP CHANGER ASSEMBLY AND A TRANSFORMER TANK ASSEMBLY

(71) Applicant: Hitachi Energy Ltd, Zürich (CH)

(72) Inventors: Anton Bergström, Ludvika (SE); Fredrik Montelius, Falun (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/562,527

(22) PCT Filed: Jan. 20, 2022

(86) PCT No.: PCT/EP2022/051244

§ 371 (c)(1),
(2) Date: Nov. 20, 2023

(87) PCT Pub. No.: WO2022/248085

PCT Pub. Date: Dec. 1, 2022

(65) Prior Publication Data

US 2024/0186050 A1 Jun. 6, 2024

(30) Foreign Application Priority Data

May 24, 2021 (EP) .................................... 21175521

(51) Int. Cl.
*H01F 27/04* (2006.01)

(52) U.S. Cl.
CPC .................................... *H01F 27/04* (2013.01)

(58) Field of Classification Search
CPC ................................................ H01F 27/00-40
(Continued)

(56) References Cited

U.S. PATENT DOCUMENTS 5,946,171 A * 8/1999 Magnier ............... H01F 27/402 361/37
2008/0100972 A1* 5/2008 Magnier ................. H01F 27/14 361/37
(Continued)

FOREIGN PATENT DOCUMENTS

CN 2403110 Y 10/2000
CN 109192480 A 1/2019
(Continued)

OTHER PUBLICATIONS

Extended European Search Report for European Patent Application No. 21175521.0, dated Nov. 22, 2021, 6 pages.
(Continued)

*Primary Examiner* — Tuyen T Nguyen
(74) *Attorney, Agent, or Firm* — Sage Patent Group

(57) ABSTRACT

A tap changer assembly includes a tap changer assembly housing completely enclosing a tap changer volume and an overflow volume. The tap changer assembly includes at least a part of a tap changer located in the tap changer volume. The tap changer volume and the overflow volume are connectable to each other via an overflow assembly. When a pressure in the tap changer volume is equal to or higher than the predetermined overflow pressure threshold, fluid communication between the tap changer volume and the overflow volume via the overflow assembly is enabled, and is prevented when the pressure is lower that the threshold. When fluid communication is enabled, an area at least 10% of a largest internal cross-sectional area between the tap changer volume and the overflow volume is enabled for fluid communication via said overflow assembly.

10 Claims, 4 Drawing Sheets

(58) Field of Classification Search
USPC ........................................................ 336/55–62
See application file for complete search history.

(56) References Cited

U.S. PATENT DOCUMENTS

| | | | |
|---|---|---|---|
| 2008/0196920 | A1 | 8/2008 | Findeisen |
| 2012/0242443 | A1 | 9/2012 | Magnier |

FOREIGN PATENT DOCUMENTS

| | | | | |
|---|---|---|---|---|
| CN | 211319871 U | | 8/2020 | |
| CN | 112331454 A | | 2/2021 | |
| KR | 20210105829 A | | 8/2021 | |
| KR | 20230158034 A | | 11/2023 | |
| NL | 86718 C | | 11/1957 | |
| WO | WO-0057438 A1 | * | 9/2000 | ............. H01F 27/14 |
| WO | 2007009960 A1 | | 1/2007 | |

OTHER PUBLICATIONS

International Search Report and Written Opinion of the International Searching Authority, PCT/EP2022/051244, mailed Apr. 21, 2022, 12 pages.
International Preliminary Report on Patentability of the International Preliminary Examining Authority, PCT/EP2022/051244, mailed Mar. 9, 2023, 14 pages.
First Office Action, Chinese Invention Patent Application No. 2022800345264, mailed Mar. 21, 2024, 9 pages.
Second Office Action, Chinese Invention Patent Application No. 2022800345264, mailed Aug. 21, 2024, 8 pages.
Decision for Grant, Korean Patent Application No. 10-2023-7034964, mailed Aug. 26, 2024, 5 pages.

* cited by examiner

TAP CHANGER ASSEMBLY AND A TRANSFORMER TANK ASSEMBLY

CROSS REFERENCE TO RELATED APPLICATIONS

This application is a 35 U.S.C. § 371 national stage application of PCT International Application No. PCT/EP2022/051244 filed on Jan. 20, 2022, which in turn claims foreign priority to European Patent Application No. 21175521.0, filed on May 24, 2021, the disclosures and content of which are incorporated by reference herein in their entirety.

TECHNICAL FIELD

The present disclosure relates to a tap changer assembly and to a transformer tank assembly comprising the tap changer assembly.

BACKGROUND

Tap changers are used for controlling the output voltage of a transformer by providing the possibility of switching in or switching out additional turns in a transformer winding. A tap changer comprises a set of fixed contacts which are connectable to a number of taps of a regulating winding of a transformer, where the taps are located at different positions in the regulating winding. By switching in or out the different taps, the effective number of turns of the transformer can be increased or decreased, thus regulating the output voltage of the transformer. The tap changer is assembled with a housing filled with insulating oil. The housing is in turn mounted in a transformer tank such that part of the tap changer housing is accessible from the outside of the tank.

In the event of a flash-over between contacts inside a tap changer housing, a short-circuit arc discharge of several hundred kiloamperes may be generated. This will immediately vaporize the surrounding insulating oil, which will send a dynamic pressure shockwave along the tap changer assembly housing followed by a significant over-pressure inside the housing. If too much energy is released, the top cover—possibly followed by the bottom of the housing—will be blown and oil will be pushed through the opening, risking a dangerous transformer fire.

It is critical that oil is not pushed out of the housing and that failure is delayed as long as possible so that a circuit breaker has time to activate and stop the current feeding the arc.

Existing devices rely on pressure relief devices (PRD) or explosion valves that are configured for a low-pressure trip level, slightly above an expected normal operating pressure. However, testing and field experience have shown that existing devices are not able to fully depressurize at larger energy faults.

SUMMARY

Therefore, an object of the disclosure is to provide an improved tap changer assembly. More specifically, an object of the disclosure is to provide a tap changer assembly which is able to handle a large and fast pressure increase inside the tap changer assembly, such as a pressure increase resulting from a flash-over. Another object of the disclosure is to provide a transformer tank assembly comprising the tap changer assembly.

According to a first aspect of the present disclosure, there is provided a tap changer assembly comprising a tap changer assembly housing completely enclosing a tap changer volume and an overflow volume, respectively. The tap changer assembly further comprises at least a part of a tap changer located in the tap changer volume. The tap changer volume and the overflow volume are connectable to each other via an overflow assembly. The overflow assembly is such that when a pressure in the tap changer volume is lower than a predetermined overflow pressure threshold, fluid communication between the tap changer volume and the overflow volume via the overflow assembly is prevented. When the pressure in the tap changer volume is equal to or higher than the predetermined overflow pressure threshold, fluid communication between the tap changer volume and the overflow volume via the overflow assembly is enabled. The tap changer volume and the overflow volume are aligned along an axis. The tap changer assembly housing has a largest internal cross-sectional area, enclosing the tap changer volume, orthogonal to the axis. When fluid communication between the tap changer volume and the overflow volume via the overflow assembly is enabled, an area at least 10% of the largest internal cross-sectional area between the tap changer volume and the overflow volume is enabled for fluid communication via the overflow assembly.

The tap changer assembly housing typically encloses at least a part of a tap changer inside the tap changer volume, such as a diverter switch and/or a tap selector. The tap changer assembly housing may be mounted in a transformer tank such that at least a part of the tap changer assembly housing is accessible from the outside of the transformer tank.

The overflow volume is also enclosed by the tap changer assembly housing and is connectable to the tap changer volume via the overflow assembly. If a flash-over occurs in the tap changer volume, a pressure inside the tap changer volume will quickly increase. If the pressure exceeds the predetermined overflow pressure threshold, fluid communication between the tap changer volume and the overflow volume via the overflow assembly is enabled. Thereby, the pressure inside the tap changer volume is relieved into the overflow volume such that over-pressure is at least not immediately relieved outside the tap changer assembly housing.

In order to quickly provide a pressure relief between the tap changer volume and the overflow volume, it is desired that a relatively large area between the tap changer volume and the overflow volume is enabled for fluid communication via the overflow assembly.

Optionally the tap changer assembly housing is such that fluid communication between the tap changer volume and the environment ambient of the tap changer volume is prevented when the pressure in the tap changer volume is lower than a predetermined precaution pressure threshold. The predetermined precaution pressure threshold is greater than the predetermined overflow pressure threshold. Fluid communication between the tap changer volume and the environment ambient of the tap changer volume is enabled when the pressure in the tap changer volume is equal to or exceeds the predetermined precaution pressure threshold.

As indicated above, the predetermined precaution pressure threshold is selected such that it is greater than the predetermined overflow pressure threshold. Thereby, in the event of an overpressure in the tap changer volume, pressure is firstly released into the overflow volume. If pressure increases more, e.g. in the tap changer volume and/or or in the overflow volume, it is released into the environment ambient of the tap changer volume. If the tap changer assembly housing is mounted with a transformer tank, the tap changer volume may be mounted at least partly inside the transformer tank such that the environment ambient of the tap changer volume is an environment inside the transformer tank. The purpose of the predetermined precaution pressure threshold is a second and additional step to relieve the overpressure in the tap changer volume and to delay the pressure increase in the overflow volume.

Optionally, fluid communication between the tap changer volume and the environment ambient of the tap changer volume is enabled by allowing a rupture in the tap changer assembly housing completely enclosing the tap changer volume, when the pressure in the tap changer volume is equal to or exceeds the predetermined precaution pressure threshold.

The tap changer assembly housing may thus be configured and designed such that a portion at least partially enclosing the tap changer volume will rupture and relieve pressure into the environment ambient of the tap changer volume when the pressure in the tap changer volume exceeds the predetermined precaution pressure threshold. The tap changer assembly housing may for instance have a reinforced bottom and flexible side walls. A flexible tap changer assembly housing will take longer time to reach the predetermined precaution pressure threshold as compared to a rigid tap changer assembly housing. Purely by way of example, a portion of the tap changer assembly housing at least partially enclosing the tap changer volume and being intended to be located in the previously mentioned transformer tank may be adapted to rupture when the pressure in the tap changer volume is equal to or exceeds the predetermined precaution pressure threshold. Purely by way of example, the portion of the tap changer assembly housing at least partially enclosing the tap changer volume may comprise a wall portion with a weakening being such that the wall portion ruptures at a pressure equal to or exceeding the predetermined precaution pressure threshold.

Optionally, the tap changer assembly further comprises a pressure relief assembly connected to the overflow volume. The pressure relief assembly is such that fluid communication between the overflow volume and the environment ambient of the overflow volume via the pressure relief assembly is prevented when the pressure in the overflow volume is lower than a predetermined relief pressure threshold. The predetermined relief pressure threshold is greater than the predetermined overflow pressure threshold. Fluid communication between the overflow volume and the environment ambient of the overflow volume via the pressure relief assembly is enabled when the pressure in the overflow volume is equal to or exceeds the predetermined relief pressure threshold.

Since the predetermined relief pressure threshold is greater than the predetermined overflow pressure threshold, the overflow volume will contain the overpressure until the pressure in the overflow volume reaches the predetermined relief pressure threshold, whereupon the pressure will be relieved into the environment ambient of the overflow volume. If the tap changer assembly housing is mounted with a transformer tank, the overflow volume will typically be mounted at least partly on an outside of the transformer tank. The environment ambient of the overflow volume may thus be an environment outside the transformer tank. The purpose of the predetermined relief pressure threshold is an additional means for relieving the overpressure in the tap changer volume and especially in the overflow volume to prevent an explosion of the overflow volume.

Optionally, the predetermined relief pressure threshold is greater than the predetermined precaution pressure threshold.

Thereby, the fluid communication between the overflow volume and the environment ambient of the overflow volume, via the pressure relief assembly, will only be enabled after the fluid communication between the tap changer volume and the environment ambient of the tap changer volume has been enabled.

Optionally, the overflow assembly comprises a fluid passage which is closed by a biased cover when fluid communication between the tap changer volume and the overflow volume is prevented. The fluid passage is open when fluid communication between the tap changer volume and the overflow volume is enabled.

The biased cover may cover an area equal to or greater than 50%, such as greater than 90%, of the largest internal cross-sectional area of the tap changer assembly housing. Spring elements, such as spring bolts may be arranged around a perimeter of the biased cover to force it against the fluid passage. The spring bolts are configured to enable fluid communication via the fluid passage when the pressure in the tap changer volume is equal to or greater than the predetermined overflow pressure threshold. The spring-bolts arranged around the perimeter of the biased cover allow a large area of the fluid passage to be opened quickly to enable fluid communication between the tap changer volume and the overflow volume.

Optionally, the overflow assembly comprises a fluid passage which is closed by a rupture disc when fluid communication between the tap changer volume and the overflow volume is prevented. The rupture disc is adapted to rupture when the pressure in the tap changer volume is equal to or higher than the predetermined overflow pressure threshold.

A rupture disc is a device designed to quickly relieve pressure when the pressure exceeds a predetermined threshold.

According to a second aspect of the present disclosure, there is provided a transformer tank assembly comprising a transformer tank and the tap changer assembly as defined hereinabove. The tap changer assembly housing is assembled with the transformer tank such that at least part of the tap changer volume is arranged inside the tank.

Optionally, the environment ambient of the tap changer volume is at least partially inside the transformer tank such that the rupture in the tap changer assembly housing completely enclosing the tap changer volume results in a fluid communication between the tap changer volume and the interior of the transformer tank.

Optionally, the tap changer assembly housing is assembled with the transformer tank such that at least part of the overflow volume is arranged outside the tank.

Optionally, the environment ambient of the overflow volume is an environment outside the transformer tank.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION OF EXAMPLE EMBODIMENTS OF THE DISCLOSURE

The present disclosure is developed in more detail below referring to the appended drawings which show examples of embodiments. The disclosure should not be viewed as limited to the described examples of embodiments. Like numbers refer to like elements throughout the description.

Figure 1:
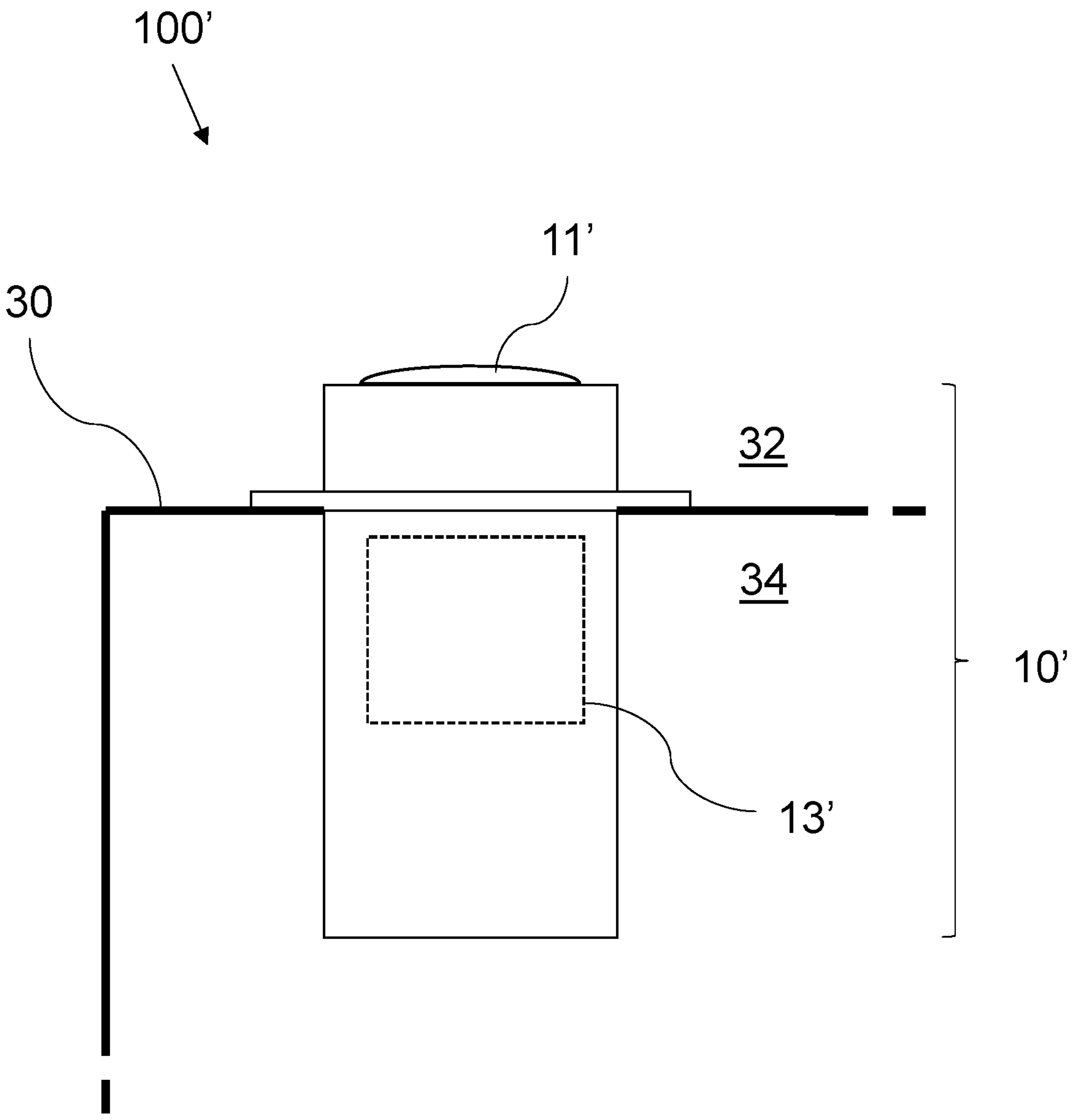
Fig. 1 (prior art)
FIG. 1 shows a schematic side view of a prior art tap changer assembly.

FIG. 1 shows a schematic side view of a prior art tap changer assembly 100', which comprises a tap changer volume 10' in which at least a part of a tap changer 13' is enclosed. The tap changer assembly 100' may be assembled with a transformer tank 30, which does not form part of the tap changer assembly 100'. The transformer tank 30 is in the figures only indicated by a part of a wall, which encloses a transformer tank volume. In practice, the transformer tank 30 houses a transformer (not shown), which may be immersed in an insulating oil inside the transformer tank 30. The tap changer assembly 100' is conventionally mounted on the wall of the transformer tank 30 such that part of the tap changer assembly 100' is accessible from an outside 32 of the transformer tank 30. The at least part of the tap changer 13' is further electrically connected to the transformer on an inside 34 of the transformer tank 30, i.e. inside the transformer tank volume. A tap changer allows the effective number of turns of a winding of the transformer to be increased or decreased, thereby regulating an output voltage of the transformer.

On the outside of the transformer tank 30, the tap changer volume 10' may be sealed by a reinforced top cover 11' comprising a pressure release device (PRD) e.g. spring-biased pressure release device and/or a burst disc or an explosion valve. In case of a flash-over between contacts inside the tap changer volume 10', a short-circuit arc discharge of several hundred kiloamperes may be generated. This would immediately vaporize the surrounding insulating oil and send a dynamic pressure shockwave along the tap changer volume 10' followed by a significant over-pressure inside the tap changer volume 10'. If too much energy is released, the top cover 11'—possibly followed by the bottom of the housing—will be blown and oil will be pushed through the opening, risking a dangerous transformer fire. The prior art tap changer assembly 100' shown in FIG. 1, having the pressure release device is configured for a low-pressure trip level slightly above an expected normal operating pressure. It is not able to fully depressurize the tap changer volume 10' at larger energy faults.

Figure 2:
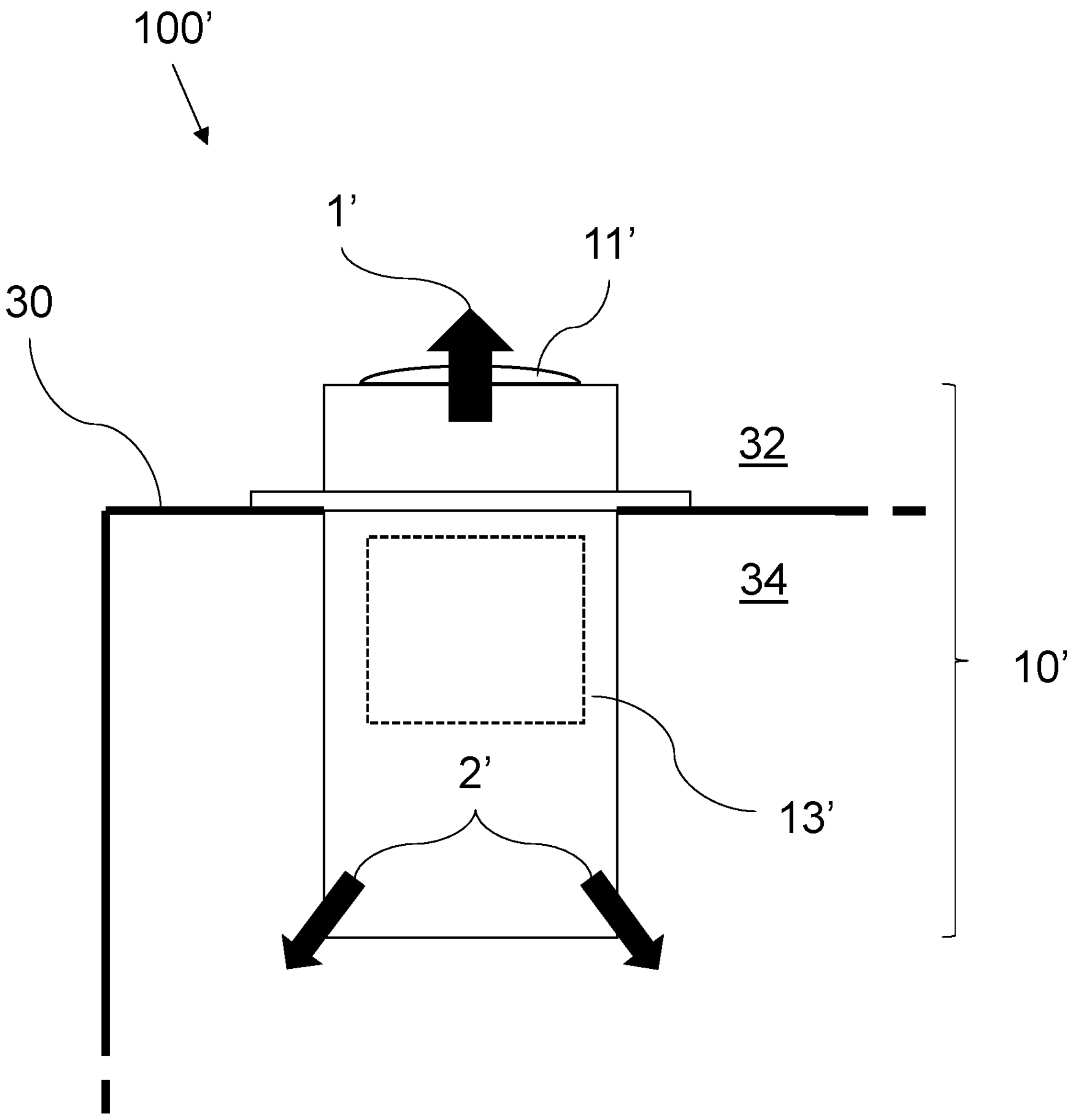
Fig. 2 (prior art)
FIG. 2 shows a pressure release sequence of the prior art tap changer assembly of FIG. 1.

As shown in FIG. 2, in the event of a short-circuit and generation of an over-pressure, a first pressure release 1' occurs through the pressure release device to the outside 32 of the transformer tank 30, possibly followed by a second pressure release 2' into the transformer tank.

Figure 3:
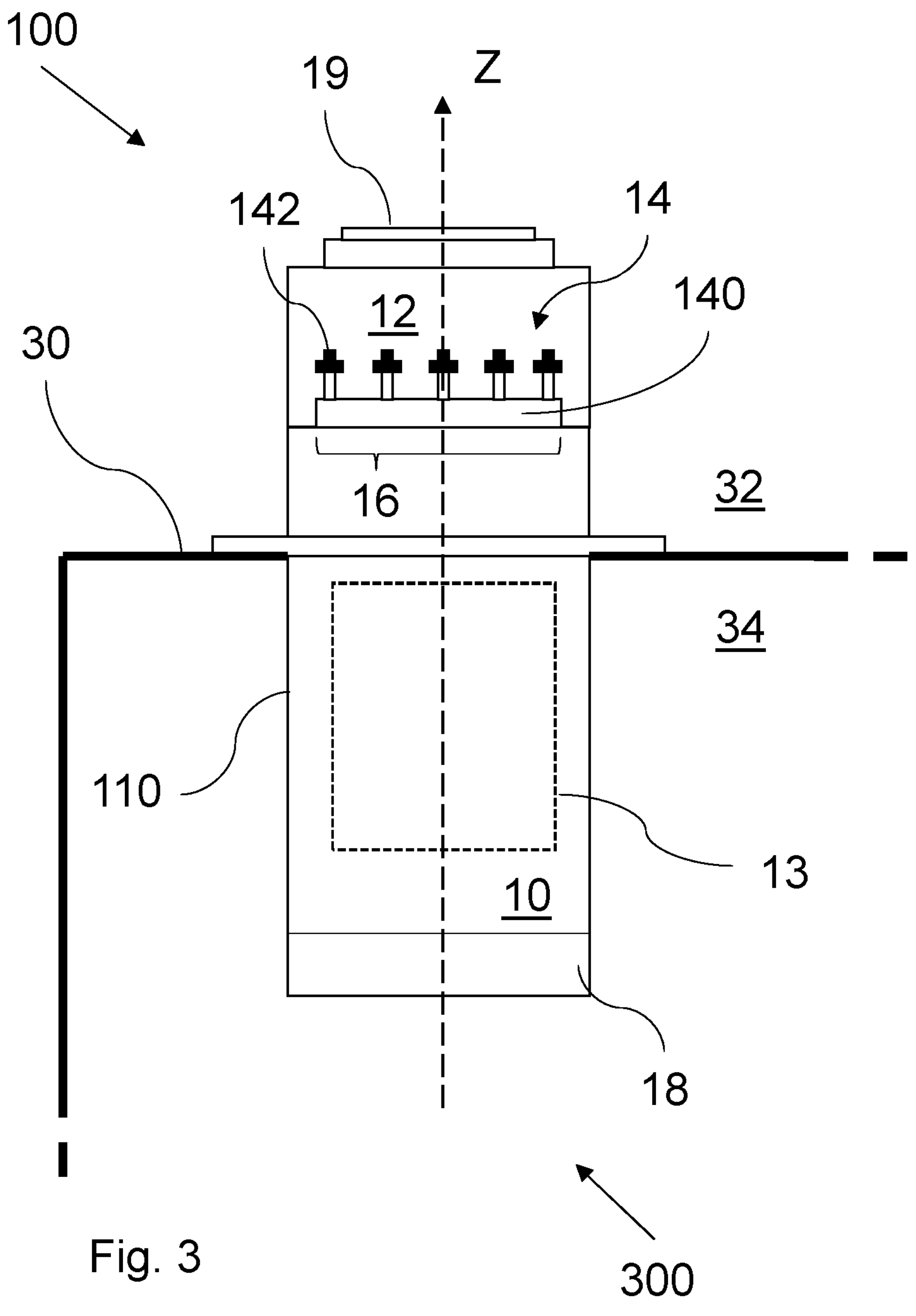
FIG. 3 shows a schematic side view of a tap changer assembly according to the present disclosure.

FIG. 3 shows a schematic side view of a tap changer assembly 100 according to the present disclosure. The tap changer assembly 100 comprises a tap changer assembly housing 110 completely enclosing a tap changer volume 10 and an overflow volume 12, respectively. The tap changer assembly 100 further comprises at least a part of a tap changer 13 located in said tap changer volume 10. The tap changer volume 10 and the overflow volume 12 are connectable to each other via an overflow assembly 14. The overflow assembly 14 is configured such that when a pressure in the tap changer volume 10 is lower than a predetermined overflow pressure threshold, fluid communication between the tap changer volume 10 and the overflow volume 12 via the overflow assembly 14 is prevented. When the pressure in the tap changer volume 10 is equal to or higher than the predetermined overflow pressure threshold, fluid communication between the tap changer volume 10 and the overflow volume 12 via the overflow assembly 14 is enabled.

The overflow assembly 14 may comprise a fluid passage 16 which may be closed by a biased cover 140 when fluid communication between the tap changer volume 10 and the overflow volume 12 is prevented. The fluid passage 16 is open when fluid communication between the tap changer volume 10 and said overflow volume 12 is enabled.

The fluid passage 16 may alternatively be closed by a rupture disc (not shown) when fluid communication between the tap changer volume 10 and the overflow volume is prevented. The rupture disc may be adapted to rupture when the pressure in the tap changer volume 10 is equal to or higher than the predetermined overflow pressure threshold. The rupture disc is designed to quickly relieve pressure when the pressure exceeds a predetermined threshold but needs to be replaced after it has been triggered.

The tap changer volume 10 and the overflow volume 12 may be aligned along an axis Z. The tap changer assembly housing 110 may have a largest internal cross-sectional area, enclosing the tap changer volume 10, orthogonal to the axis Z. In the FIG. 3 embodiment, the tap changer volume 10 exemplified as a prismatic volume along the axis Z. However, it is also envisaged that the tap changer volume 10 may be non-prismatic such that the cross-section of the of the tap changer volume 10, orthogonal to the axis Z, may vary. In any event, the largest internal cross-sectional area of the tap changer assembly housing 110 is the largest internal cross-sectional area thereof which encloses the tap changer volume 10.

When fluid communication between the tap changer volume 10 and the overflow volume 12 via the overflow assembly 14 is enabled, an area at least 10% of the cross-sectional area between the tap changer volume 10 and the overflow volume 12 is enabled for fluid communication via the overflow assembly 14. By providing a relatively large area for the fluid communication via the overflow assembly 14, it is ensured that pressure in the tap changer volume 10 may quickly be relieved into the overflow volume 12.

The biased cover 140 may cover an area equal to or greater than 50%, such as greater than 90%, of the largest internal cross-sectional area of the tap changer assembly housing 10. Spring bolts 142, may be arranged around a perimeter of the biased cover 140 to force it against the fluid passage 16. The springs bolts 142 are adapted to allow the biased cover 140 to open the fluid passage 16 and enable fluid communication via the fluid passage 16 when the pressure in the tap changer volume 10 is equal to or greater than the predetermined overflow pressure threshold. Using spring-bolts arranged around the perimeter of the biased cover, instead of a hinged cover, allows the relatively large area of the fluid passage to be opened quickly to enable fluid communication between the tap changer volume 10 and the overflow volume 12. Instead of, or in addition to the above-mentioned spring bolts 142, other biasing means (not shown) may be used to force the cover 140 to seal the fluid passage 16 when the pressure in the tap changer volume 10 is lower than the predetermined overflow pressure threshold. Purely by way of example, such biasing means may be obtained by magnetic elements (not shown) or sealing members biasing the cover 140 to seal the fluid passage 16 by means of gravity.

The tap changer assembly housing 110 may further be adapted such that fluid communication between the tap changer volume 10 and the environment ambient of the tap changer volume 10 is prevented when said pressure in said tap changer volume 10 is lower than a predetermined precaution pressure threshold, where the predetermined precaution pressure threshold is greater than the predetermined overflow pressure threshold. Fluid communication between the tap changer volume 10 and the environment ambient of the tap changer volume 10 is enabled when the pressure in the tap changer volume 10 is equal to or exceeds the predetermined precaution pressure threshold.

The tap changer volume 10 may comprise a reinforced surface 18, such as an end surface, e.g. a reinforced bottom, of the tap changer volume 10. The reinforced surface 18 may be arranged perpendicular to the axis Z.

A part of the tap changer assembly housing 110 enclosing the tap changer volume 10 may be provided with a flexible wall. The flexible wall may for instance be made of glass fibre. The flexible wall of the tap changer volume 10 may have a cylindrical shape and may be joined with the reinforced surface 18 at an interface between the flexible wall and the reinforced surface 18. As compared to a rigid wall, the flexible wall may delay the point in time at which a certain pressure is reached, such as the predetermined overflow pressure threshold or the predetermined precaution pressure threshold. More time may allow circuit breakers to break the current and extinguish the arc which creates the over-pressure. Further pressure release from the tap changer volume 10 may thereby not be required.

Fluid communication between the tap changer volume 10 and the environment ambient of the tap changer volume 10 may be enabled by allowing a rupture in the tap changer assembly housing 110 completely enclosing the tap changer volume 10, such as the flexible wall enclosing the tap changer volume 10, when the pressure in the tap changer volume 10 is equal to or exceeds the predetermined precaution pressure threshold. The connection between the flexible wall and the reinforced surface 18 may be adapted to rupture when the pressure in the tap changer volume 10 is equal to or exceeds the predetermined precaution pressure threshold. As such, though purely by way of example, the environment ambient of the tap changer volume may be at least partially inside the transformer tank 30. The flexible wall and the reinforced surface 18 may be adapted such that the rupture in the tap changer assembly housing 110 completely enclosing the tap changer volume 10 results in a fluid communication between the tap changer volume 10 and the interior of the transformer tank 30.

The tap changer assembly 100 may further comprise a pressure relief assembly 19 connected to said overflow volume 12. The pressure relief assembly 19 is such that fluid communication between the overflow volume and the environment ambient of the overflow volume 12 via the pressure relief assembly 19 is prevented when the pressure in the overflow volume 12 is lower than a predetermined relief pressure threshold. The predetermined relief pressure threshold is greater than the predetermined overflow pressure threshold. Fluid communication between the overflow volume 12 and the environment ambient of the overflow volume 12 via the pressure relief assembly 19 is enabled when the pressure in the overflow volume 12 is equal to or exceeds the predetermined relief pressure threshold.

Since the predetermined relief pressure threshold is greater than the predetermined overflow pressure threshold, the overflow volume will contain the overpressure until the pressure in the overflow volume reaches the predetermined relief pressure threshold, whereupon the pressure will be relieved into the environment ambient of the overflow volume. The predetermined overflow pressure threshold, set by the pressure relief assembly 19, is higher than the conventional pressure release device comprised in the top cover 11' in FIGS. 1 and 2. The purpose of the predetermined relief pressure threshold is to provide a further delay to relieve the overpressure in the tap changer volume 10, and especially in the overflow volume 10, to prevent an explosion of the overflow volume 12, which could lead to oil being leaked to the environment ambient of the overflow volume 12.

The predetermined relief pressure threshold may be greater than the predetermined precaution pressure threshold. Thereby, the fluid communication between the overflow volume 12 and the environment ambient of the overflow volume 12, via the pressure relief assembly 19, will only be enabled after the fluid communication between the tap changer volume 10 and the environment ambient of said tap changer volume 10 has been enabled.

FIG. 3 also shows a second embodiment of the present disclosure. There is provided a transformer tank assembly 300 comprising a transformer tank 30 (only partly shown) and the tap changer assembly 100 as described hereinabove. The tap changer assembly housing 110 is assembled with the transformer tank 30 such that at least part of the tap changer volume 10 is arranged inside the tank, i.e. on the inside 34 of the transformer tank 30. When fluid communication between the tap changer volume 10 and the environment ambient of the tap changer volume 10 is enabled it may be defined as a fluid communication between the tap changer volume 10 and the inside 34 of the transformer tank 30, The tap changer assembly housing 110 may be assembled with the transformer tank 30 such that at least part of the overflow volume 12 is arranged outside the tank, i.e. on the outside 32 of the transformer tank 30. The environment ambient of the overflow volume 12 may thus be defined as an environment outside the transformer tank 30.

Figure 4:
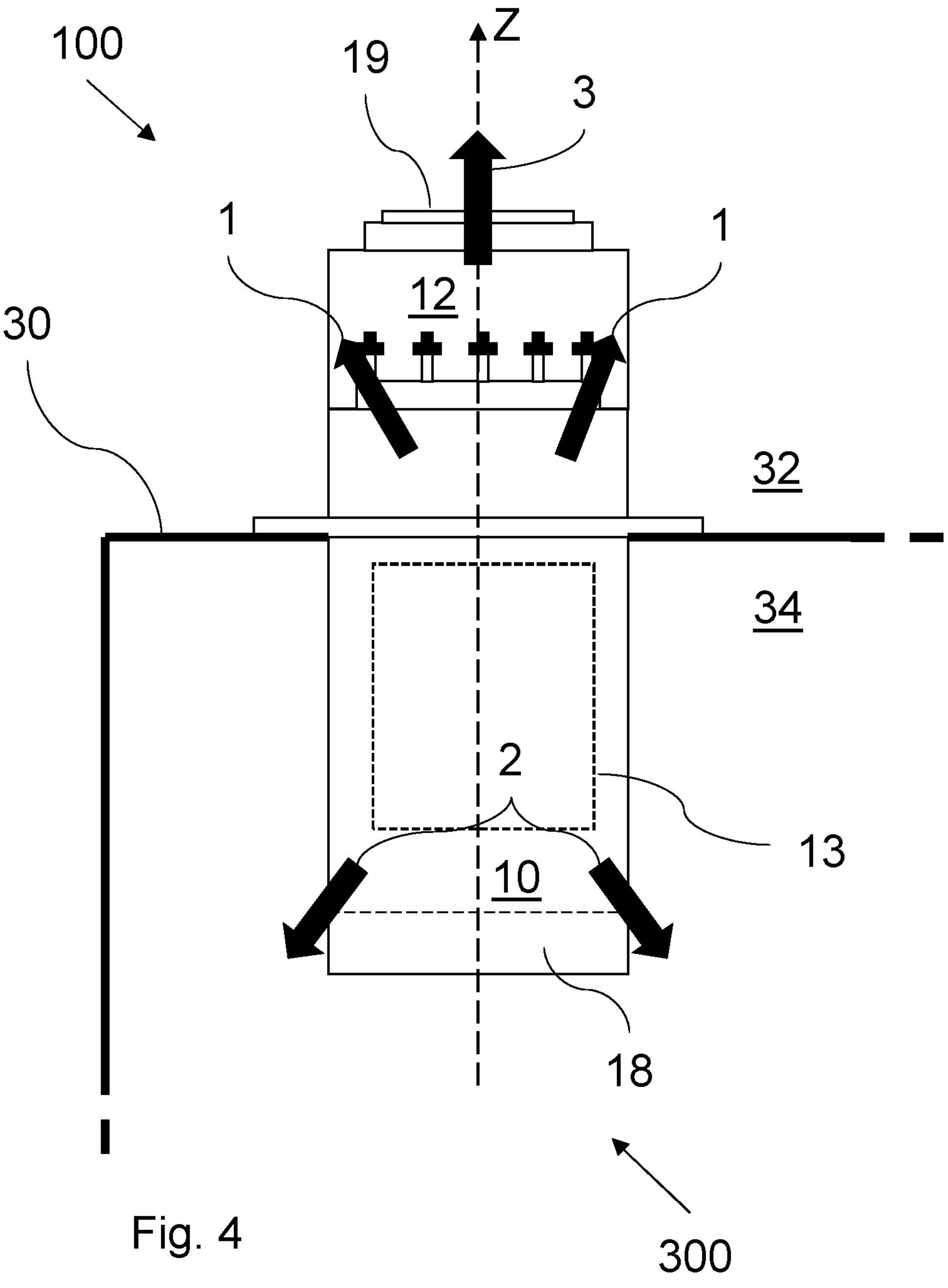
FIG. 4 shows a pressure release sequence of the tap changer assembly of FIG. 3.

FIG. 4 shows a pressure release sequence of the tap changer assembly 100 of FIG. 3. In the event of a short-circuit and generation of an over-pressure, a first pressure release 1 occurs by enabling fluid communication via the overflow assembly 14, which may be a biased cover 140, from the tap changer volume 10 into the overflow volume 12 when the pressure in the tap changer volume 10 is equal to or higher than the predetermined overflow pressure threshold.

A second pressure release 2 may occur by enabling fluid communication between the tap changer volume 10 and the environment ambient of the tap changer volume 10 when the pressure in the tap changer volume 10 is equal to or exceeds the predetermined precaution pressure threshold. Such fluid communication may be enabled by a rupture in the tap changer assembly housing 110 as described hereinabove.

In case of a very high over-pressure, a third pressure release 3 may occur by enabling fluid communication between the overflow volume 12 and the environment ambient of the overflow volume 12 via the pressure relief assembly 19 when the pressure in the overflow volume 12 is equal to or exceeds the predetermined relief pressure threshold. In order to avoid damage and personal injuries, such fluid communication may be guided by tubing to control expulsion of e.g. transformer oil away from areas which may be occupied by people in the vicinity of the overflow volume 12.

By providing the sequence of pressure relief events, dangerous leakage of oil outside the transformer tank 30 may be avoided and a transformer fire may be prevented. By delaying/extending the development of the over-pressure time may also be provided to allow the circuit breakers of the at least part of a tap changer 13 to break the current and extinguish the arc to stop the increase of the over-pressure. Moreover, the above procedure implies an appropriately low risk of having fluid leaking from the transformer tank assembly 300 since at least each one of the first pressure release 1 and the second pressure release 2 may be carried out without any leakage outside the transformer tank assembly 300.

The sequence may be established by ensuring that the predetermined relief pressure threshold is greater than both the predetermined overflow pressure threshold and the predetermined precaution pressure threshold. Further, the predetermined precaution pressure threshold is greater than the overflow pressure threshold.

The transformer tank assembly 300 and/or the tap changer assembly 100 may further comprise an oil conservator (not shown) fluidly connectable to the transformer tank 30 and/or to the overflow volume 12 via conduits (not shown). The conduits may comprise a shutter valve, a sensor and a control unit such that when the sensor detects a predetermined over-pressure in the tap changer assembly 100, the control unit disables fluid communication between the oil conservator and the transformer tank 30 and or to the overflow volume 12. Thereby, it can be ensured that oil is prevented from leaking to the outside 32 of the transformer tank 30 in the unlikely event that the overflow volume 12 breaks due to the over-pressure.

The invention claimed is:

1. A tap changer assembly comprising a tap changer assembly housing completely enclosing a tap changer volume and an overflow volume, respectively, said tap changer assembly further comprising at least a part of a tap changer located in said tap changer volume, said tap changer volume and said overflow volume being connectable to each other via an overflow assembly, such that said overflow assembly is such that:

when a pressure in said tap changer volume is lower than a predetermined overflow pressure threshold, fluid communication between said tap changer volume and said overflow volume via said overflow assembly is prevented and when said pressure in said tap changer volume is equal to or higher than said predetermined overflow pressure threshold, fluid communication between said tap changer volume and said overflow volume via said overflow assembly is enabled, the tap changer volume and the overflow volume being aligned along an axis, the tap changer assembly housing having a largest internal cross-sectional area, enclosing said tap changer volume, orthogonal to the axis, and, when fluid communication between said tap changer volume and said overflow volume via said overflow assembly is enabled, an area at least 10% of said largest internal cross-sectional area between the tap changer volume and the overflow volume is enabled for fluid communication via said overflow assembly, and the overflow assembly comprising a fluid passage which is closed by a biased cover when fluid communication between said tap changer volume and said overflow volume is prevented, and which fluid passage is open when fluid communication between said tap changer volume and said overflow volume is enabled.

2. The tap changer assembly according to claim 1, wherein said a tap changer assembly housing is such that:

fluid communication between said tap changer volume and the environment ambient of said tap changer volume is prevented when said pressure in said tap changer volume is lower than a predetermined precaution pressure threshold, said predetermined precaution pressure threshold being greater than said predetermined overflow pressure threshold, and fluid communication between said tap changer volume and the environment ambient of said tap changer volume is enabled when said pressure in said tap changer volume is equal to or exceeds said predetermined precaution pressure threshold.

3. The tap changer assembly according to claim 2, wherein fluid communication between said tap changer volume and the environment ambient of said tap changer volume is enabled by allowing a rupture in said tap changer assembly housing completely enclosing said tap changer volume when said pressure in said tap changer volume is equal to or exceeds said predetermined precaution pressure threshold.

4. The tap changer assembly according to claim 1, wherein the tap changer assembly further comprises a pressure relief assembly connected to said overflow volume, said pressure relief assembly being such that:

fluid communication between said overflow volume and the environment ambient of said overflow volume via said pressure relief assembly is prevented when said pressure in said overflow volume is lower than a predetermined relief pressure threshold, said predetermined relief pressure threshold being greater than said predetermined overflow pressure threshold, and fluid communication between said overflow volume and the environment ambient of said overflow volume via said pressure relief assembly is enabled when said pressure in said overflow volume is equal to or exceeds said predetermined relief pressure threshold.

5. The tap changer assembly according to claim 4, wherein said a tap changer assembly housing is such that:

fluid communication between said tap changer volume and the environment ambient of said tap changer volume is prevented when said pressure in said tap changer volume is lower than a predetermined precaution pressure threshold, said predetermined precaution pressure threshold being greater than said predetermined overflow pressure threshold, and fluid communication between said tap changer volume and the environment ambient of said tap changer volume is enabled when said pressure in said tap changer volume is equal to or exceeds said predetermined precaution pressure threshold, said predetermined relief pressure threshold being greater than said predetermined precaution pressure threshold.

6. The tap changer assembly according to claim 1, wherein the overflow assembly comprises a fluid passage which is closed by a rupture disc when fluid communication between said tap changer volume and said overflow volume is prevented, said rupture disc being adapted to rupture when said pressure in said tap changer volume is equal to or higher than said predetermined overflow pressure threshold.

7. A transformer tank assembly comprising a transformer tank and the tap changer assembly according to claim 1, the tap changer assembly housing being assembled with the transformer tank such that at least part of the tap changer volume is arranged inside the transformer tank.

8. The transformer tank assembly according to claim 7, wherein said a tap changer assembly housing is such that:

fluid communication between said tap changer volume and the environment ambient of said tap changer volume is prevented when said pressure in said tap changer volume is lower than a predetermined precaution pressure threshold, said predetermined precaution pressure threshold being greater than said predetermined overflow pressure threshold, and fluid communication between said tap changer volume and the environment ambient of said tap changer volume is enabled when said pressure in said tap changer volume is equal to or exceeds said predetermined precaution pressure threshold, wherein fluid communication between said tap changer volume and the environment ambient of said tap changer volume is enabled by allowing a rupture in said tap changer assembly housing completely enclosing said tap changer volume when said pressure in said tap changer volume is equal to or exceeds said predetermined precaution pressure threshold, and wherein the environment ambient of said tap changer volume is at least partially inside the transformer tank such that said rupture in said tap changer assembly housing completely enclosing said tap changer volume results in a fluid communication between said tap changer volume and an inside of said transformer tank.

9. A transformer tank assembly comprising a transformer tank and the tap changer assembly according to claim 1, the tap changer assembly housing being assembled with the transformer tank such that at least part of the overflow volume is arranged outside the tank.

10. The transformer tank assembly according to claim 9, wherein the tap changer assembly further comprises a pressure relief assembly connected to said overflow volume, said pressure relief assembly being such that:

fluid communication between said overflow volume and the environment ambient of said overflow volume via said pressure relief assembly is prevented when said pressure in said overflow volume is lower than a predetermined relief pressure threshold, said predetermined relief pressure threshold being greater than said predetermined overflow pressure threshold, and fluid communication between said overflow volume and the environment ambient of said overflow volume via said pressure relief assembly is enabled when said pressure in said overflow volume is equal to or exceeds said predetermined relief pressure threshold, and wherein the environment ambient of said overflow volume is an environment outside the transformer tank.

* * * * *